United States Patent [19]

Van Slooten et al.

[11] Patent Number: 5,165,908
[45] Date of Patent: Nov. 24, 1992

[54] ANNULAR HEATED FLUIDIZED BED REACTOR

[75] Inventors: Richard A. Van Slooten, E. Aurora; Ravi Prasad, E. Amherst, both of N.Y.

[73] Assignee: Advanced Silicon Materials, Inc., Moses Lake, Wash.

[21] Appl. No.: 610,978

[22] Filed: Nov. 9, 1990

Related U.S. Application Data

[60] Division of Ser. No. 484,478, Feb. 23, 1990, Pat. No. 4,992,245, which is a continuation of Ser. No. 175,901, Mar. 31, 1988, abandoned.

[51] Int. Cl.$^5$ .............................................. C01B 33/11
[52] U.S. Cl. .................................. 423/349; 423/348; 427/213; 156/DIG. 64
[58] Field of Search ................ 423/349, 348; 427/213; 156/DIG. 64

[56] References Cited

U.S. PATENT DOCUMENTS

| | | | |
|---|---|---|---|
| 4,416,913 | 11/1983 | Ingle et al. | 427/45.1 |
| 4,424,199 | 1/1984 | Iya | 423/349 |
| 4,444,811 | 4/1984 | Hsu et al. | 427/213 |
| 4,710,260 | 12/1987 | Witter et al. | 156/605 |
| 4,820,587 | 4/1989 | Gautreaux et al. | 428/403 |
| 4,868,013 | 9/1989 | Allen | 427/213 |

FOREIGN PATENT DOCUMENTS

| | | | |
|---|---|---|---|
| 0363742 | 4/1990 | European Pat. Off. | 423/349 |
| 1031312 | 2/1986 | Japan | 423/349 |

Primary Examiner—Olik Chaudhuri
Assistant Examiner—Ken Horton
Attorney, Agent, or Firm—Klarquist, Sparkman, Campbell, Leigh & Whinston

[57] ABSTRACT

An improved fluidized bed reactor characterized by a peripheral heating zone annulus containing particles of the fluidized bed. The particles are heated in the heating zone annulus and transferred to an inner reaction zone. The particles enter the heating zone annulus at an upper inlet and exit the heating zone annulus at a lower outlet. The heated particles supply heat to the inner reaction zone.

11 Claims, 1 Drawing Sheet

ANNULAR HEATED FLUIDIZED BED REACTOR

This application is a division of prior U.S. application Ser. No. 07/484,478 Filing Date Feb. 23, 1990 now U.S. Pat. No. 4,992,245 which is a continuation of application Ser. No. 175,901 Mar. 31, 1984 which is abandoned.

BACKGROUND OF THE INVENTION

This invention relates to an improved heated fluidized bed reactor, and a method for heating such reactor. In a preferred embodiment, the present invention relates to an improved heated fluidized bed reactor used in the production of polycrystalline silicon by the pyrolysis of silane containing gases.

A variety of means are known in the art for supplying the necessary heat to fluidized bed reaction zones. For example, in the pyrolysis of silane containing gas to silicon, heat can be provided by capacitive heating of the fluidized bed reaction zone, as discussed in U.S. Pat. No. 4,292,344 to McHale. Other methods of heating such as uniform induction coils, electrical resistance elements and indirect gas fired heaters have also been used and are disclosed in U.S. Pat. Nos. 3,012,861 to Ling and 3,012,862 to Bertrand et al. A suitable heat transfer fluid and inductive or electrical resistance heaters are also examples of means for directly supplying heat to the surfaces of conventional fluidized bed reactors. While adequate for the purposes of some fluidized bed applications, these means are not always satisfactory for other fluidized bed applications because of the nature of the reactions occurring therein and the heat requirements of the fluidized bed.

For instance, in the production of polycrystalline silicon from silane containing gases in a fluidized bed reaction zone, conventional means for supplying heat to the wall of the fluidized bed are generally unsatisfactory. In this example, silicon particles are suspended in a fluidizing gas stream into which silane containing gases are introduced. The process conditions are desirably maintained so that the decomposition of the silane containing gas occurs heterogeneously on the surface of the silicon particles of the fluidized bed, rather than on the hot wall of the fluidized bed. The silicon particles grow and enlarge by the deposit of silicon thereon so that sufficiently large silicon product particles are produced and removed from a collection zone below the reaction zone.

Supplying heat to the wall of the fluidized bed reaction zone causes the temperature of the wall to be higher compared to the temperature of the silicon particles. This may result in an undesired deposition of the silicon on the wall of the reaction zone, in preference to the desired deposition of the silicon onto the surface of the fluidized silicon particles. In addition to reducing the amount of silicon that deposits onto the surface of the silicon particles, the deposition of silicon on the reactor walls has the effect of reducing the heat transfer efficiency into the reaction zone because of the additional layer through which the heat must travel.

Therefore, a need exists for an improved heated fluidized bed reactor, useful, for example, as an improved heated fluidized bed reactor for the production of high purity polycrystalline silicon.

SUMMARY OF THE INVENTION

The present invention is an improved heated fluidized bed reactor and a method for supplying heat to the reactor. The improved fluidized bed reactor includes a reaction vessel containing a peripheral heating zone annulus that surrounds an inner fluidized bed reaction zone. A heat source supplies heat to fluidized bed particles contained in the heating zone annulus. The heating zone laterally confines the particles from the fluidized bed in an incipient fluidized state. The heating zone annulus includes an upper inlet for the entry of the particles from the fluidized bed and a lower outlet for introducing heated particles from the heating zone annulus into the inner reaction zone. Heat is supplied to the inner reaction zone through the boundary of the inner reaction zone and by the heated particles of the heating zone annulus that enter the inner reaction zone from the lower outlet of the heating zone annulus.

In another embodiment, the present invention is a method of supplying heat to a fluidized bed reaction zone by introducing heated particles from a peripheral heating zone annulus to the inner fluidized bed reaction zone. The peripheral heating zone annulus surrounds the inner reaction zone within a reaction vessel. The peripheral heating zone annulus includes an upper inlet for entry of particles from the fluidized bed and a lower outlet for introducing heated particles from the heating zone annulus into the inner reaction zone. The particles from the fluidized bed in the heating zone annulus are in an incipient fluidized state and are laterally confined by the inner reaction zone wall and an outer heating zone wall. Heat is supplied to the particles in the peripheral heating zone annulus through the outer heating zone wall by a heating means disposed externally to the outer heating zone wall.

In still another embodiment, the present invention is a method for producing high purity polycrystalline silicon by pyrolyzing a silane containing gas in a heated inner fluidized bed reaction zone. Heat is supplied to the inner reaction zone through the boundary of the inner reaction zone and by heated silicon particles that have been introduced into the inner reaction zone after passing through a peripheral heating zone annulus. The peripheral heating zone annulus is defined by the annular space between the wall of the inner reaction zone and an outer heating zone wall. Heat is supplied to the particles in the peripheral heating zone annulus by a heating means disposed externally to the outer heating zone wall.

In accordance with the present invention, an improved heated fluidized bed reactor including a peripheral heating zone annulus is provided. Other objects, features and advantages of the present invention will be readily apparent from the following description of certain preferred embodiments thereof, taken in conjunction with the accompanying drawings. It is to be understood that variations and modifications may be effected without departing from the spirit and scope of the novel concepts of the present invention.

DETAILED DESCRIPTION OF THE INVENTION

Figure 1:
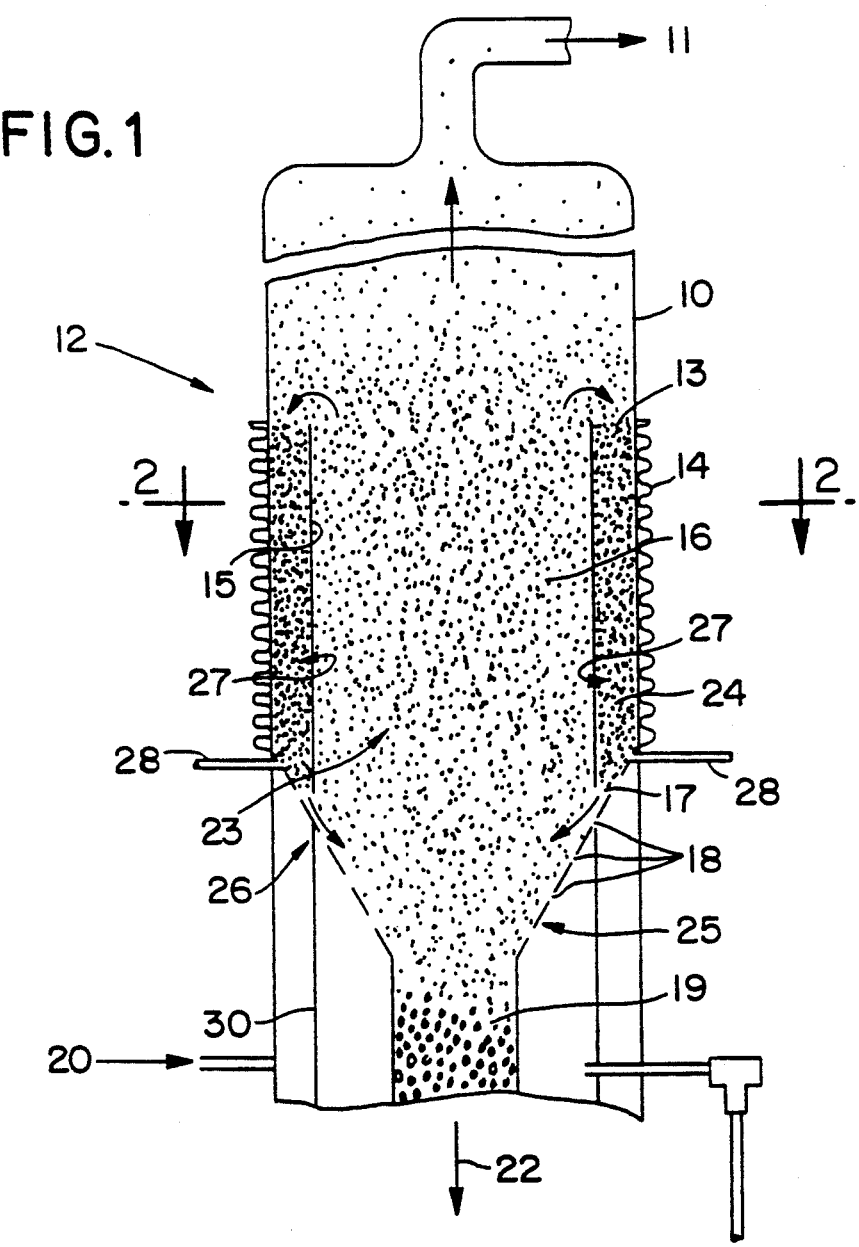
FIG. 1 illustrates a cross-sectional view of the annular heated fluidized bed reactor in accordance with a preferred embodiment of the present invention.

The present invention is described herein with regard to a preferred embodiment relating to the pyrolysis of silane containing gases to silicon. It is understood that the present invention is equally applicable to other types of fluidized bed operations requiring the input of heat. Examples of such operations include catalytic reactions, ion exchange reactions, separation operations and the like, wherein a fluidized bed of particles requires the input of heat.

As used herein, the term "heterogeneous decomposition" refers to the reduction of silane or a halosilane to silicon that occurs in two or more phases such as when the decomposition occurs at a boundary between a gas and a solid phase. The heterogeneous decomposition results in the deposition of silicon on either silicon particles in the fluidized bed or on the exposed internal surfaces of the fluidized bed reactor. "Homogeneous decomposition" occurs in a single phase, such as the gas phase, and produces high surface area silicon powder or dust in the micron to submicron size range. Generally, for a given temperature, the decomposition of silane and halosilanes will be either heterogeneous and/or homogeneous, depending on the concentration of the silane and/or halosilane containing gas. Generally, a low silane and/or halosilane feed concentration is desired to maintain the decomposition of silane and halosilane containing gases to silicon in a heterogeneous mode. However, a very low feed concentration of silane and/or halosilane containing gases may not provide a high production rate of silicon.

The term "silicon seed particle" means those particles of the fluidized bed that range in particle size from about 50 microns to about 400 microns. These particles grow and enlarge as silicon is deposited thereon, and are eventually collected as silicon product particles. "Silicon product particles" describes the silicon seed particles that have grown and enlarged to a particle size ranging from at least about 400 microns, preferably about 400 microns to about 1300 microns. The silicon product particles segregate in a collection zone near the bottom of the reaction zone and are removed therefrom by conventional means. The term "silicon particle" refers to both silicon seed particles and silicon product particles of the fluidized bed.

The term "silicon powder" refers to generally micron to submicron, high surface area silicon resulting from the homogeneous decomposition of the silane and/or halosilane containing gas.

As used herein, the term "silane containing gas" refers to both silane and/or halosilane containing gases unless otherwise indicated.

The term "total fluidizing gas" as used herein refers to the combination of silane containing gas and any other additional carrier gas which is added to the fluidized bed reactor to aid in the fluidization of the silicon particles and/or to control the reaction rate or heat transfer.

Polycrystalline silicon may be prepared by introducing a flow of silane containing gas into a heated fluidized bed of silicon particles suspended in a reaction zone. These silicon particles are suspended by the upward flow of the silane containing gas and the carrier gas passing through the reaction zone. The total gas velocity through the reaction zone is maintained above the minimum fluidization velocity of the silicon particles. The temperature of the silicon particles in the reaction zone ranges between the decomposition temperature of the silane containing gas and the melting point temperature of silicon. The silane containing gas decomposes to form silicon that deposits on the surface of the silicon particles. As the silicon deposits on the silicon particles, these particles enlarge and segregate in a collection zone near the bottom of the fluidized bed. The collected product particles are recovered from the collection zone by conventional means.

The silane containing gas is introduced into the fluidized bed reaction zone from the bottom thereof in accordance with conventional practices such as a gas distributor. The silane containing gas may be introduced without dilution or the gas may be diluted with hydrogen or an inert carrier gas such as argon, helium, or the like. In this gas distribution zone, the distributor surface is cooled to a temperature ranging from about 200° C. to about 400° C., by cooling water, nitrogen, or the like. Such temperatures are maintained to prevent the premature decomposition of silane containing gases to silicon and to prevent the deposition on the distributor apparatus.

Any suitable silane containing gas capable of being thermally pyrolyzed or reduced in the gas phase to silicon can be used as a feed gas to the fluidized bed. Illustrative of such gases are silane and the halosilanes of chlorine, bromine, fluorine, and iodine. While the chlorosilanes, such as trichlorosilane, tetrachlorosilane, and dichlorosilane may be employed, particular advantages are realized through the use of silane. The pyrolysis of silane is slightly exothermic, goes substantially to completion, is irreversible, and is initiated at a lower temperature of about 200° C. when compared to the temperature necessary to pyrolyze halosilane containing gases and the like. In addition, the silane and its decomposition products, i.e., silicon and hydrogen, are noncorrosive and nonpolluting. The by-product hydrogen gas generated (1 mole of silane yields 2 moles of hydrogen) may be used as a recycle carrier gas within the reaction system. In comparison, the thermal decomposition of chlorosilane is a reversible and incomplete reaction that results in the production of reaction by-products that are corrosive in nature. Accordingly, silane is a preferred gas for use when the present invention is used to pyrolyze silane containing gas to silicon, although other silane containing gases may be utilized.

The silane containing gas and the carrier gas streams can be introduced into the reaction zone by employing a conventional gas distributor below the reaction zone. The bottom of the fluidized bed is also where seed particles may be introduced into the fluidizing gas. The total fluidizing gas velocity through the reaction zone generally ranges from about two to eight times the minimum fluidization velocity necessary to fluidize the particles of average diameter within the bed. As used herein, the term "average diameter" means one over the summation of the quotients of the weight fraction and particle diameter attributed to the particular fraction of particles. Preferably, the total fluidizing gas velocity is about four to six times the minimum fluidization velocity based on the average diameter of the particles in the fluidized bed. The minimum fluidization velocity may be determined by conventional means known in the art, such as the equation:

$$\frac{1.75 D_p^2 \rho^2}{\phi_s \epsilon^3 \mu^2} \overline{V}_o^2 + \frac{150 D_p \rho (1-\epsilon)}{\phi_s^2 \epsilon^3 \mu} \overline{V}_o - \frac{D_p^3 g \rho (\rho_p - \rho)}{\mu^2} = 0$$

wherein $\overline{V}_o$ = minimum superficial gas velocity for fluidization (cm/s)
$D_p$ = average diameter of particles in the bed (cm)
$\rho$ = density of fluidization gas (g/cm$^3$)
$\rho$ = density of particles (g/cm$^3$)
$\phi_s$ = sphericity of particles
$\epsilon$ = void fraction in bed of particles at minimum fluidization
$\mu$ = absolute viscosity of fluidizing gas (g/cm-s)
$g$ = gravitation acceleration (cm/s$^2$)

The minimum fluidization velocity is a strong function of gas viscosity and gas density, as well as average particle diameter, particle shape and void fraction. Thus, the minimum fluidization velocity may cover a wide range with small change in these factors.

In the production of polycrystalline silicon in the fluidized bed reactor described herein, silicon seed particles must be supplied to the fluidized bed reaction zone. In order to supply replenishing seed particles to the fluidized bed, a small fraction of the product material can be suitably crushed or ground into small, fine seed-sized particles. These particles may then be reintroduced into the fluidized bed. Upon introduction, the small seed particles become sites for the deposition of silicon resulting from the silane decomposition. As the silane is decomposed and the silicon deposited, the particles grow and enlarge in size. The enlarged silicon product particles segregate in a collection zone near the bottom of the reaction zone. The silicon product particles are collected by continuously or periodically removing the product particles from the collection zone. The product particles are of sufficient size to be easily handled without undue contamination of the high purity silicon material. It is to be understood that the particular type of the particles comprising the fluidized bed are not critical to the invention per se. The particles may be of the types commonly employed in the various fluidized bed applications known in the art.

The fluidized bed reactor in accordance with a preferred embodiment of the present invention is a generally vertical reaction vessel wherein the desired fluidized bed reaction is carried out. A preferred reaction is the pyrolysis of silane containing gas to silicon that deposits on silicon particles in a fluidized bed reaction zone. The fluidized bed reactor in the context of the present invention includes a peripheral heating zone annulus surrounding an inner reaction zone. The inner boundary of the heating zone annulus is defined by the inner reaction zone wall that surrounds the fluidized bed of particles. The outermost boundary (i.e., outer heating zone wall) of the heating zone annulus is defined by the wall or liners of the cylindrical reaction vessel. This configuration resembles a small inner cylinder (i.e., inner reaction zone wall) disposed within a larger outer cylinder (i.e., outer heating zone wall). The interior of the small inner cylinder defines the reaction zone, with the annular space between the inner and outer cylinder defining the peripheral heating zone annulus. While the cylindrical vessel and reaction zone are preferred, it is to be understood that any configurations that are acceptable to fluidized bed operations can be used as long as space is provided for the heating zone annulus between the reaction vessel wall or liners and the inner reaction zone wall.

The dimensions of the particular reaction vessel and reaction zone are not critical to the practice of the present invention. The particular dimensions will be primarily dependent upon the economics of design. The reaction zone must not be too narrow or this leads to low production efficiency; however, it must not be too large or this leads to increased energy costs associated with heat transfer inefficiencies and bed fluidization difficulties.

In the production of silicon, the ratio of bed height to bed diameter of the reaction zone wherein the silicon particles are suspended by the total fluidizing gas flow ranges from about 1:1 up to about 10:1, preferably, 1:1 to about 5:1. The skilled artisan will appreciate that the particular ratio of bed height to bed diameter will primarily be dependent upon the total fluidizing gas velocity, the silicon seed particle size and the silicon product particle size. The diameter of the reaction zone preferably ranges from about 15 cm to about 122 cm, and more preferably about 30 cm. The outer cylinder (i.e., outer heating zone wall) that defines the outer boundary of the peripheral heating zone is preferably concentrically positioned in relationship to the inner cylinder defining the reaction zone. The length of the outer cylinder is equal to or preferably greater than the length of the inner cylinder defining the reaction zone. The preferred increased height of the outer cylinder provides a disengagement zone that allows entrained particles to lose their upward velocity and gravitate back into the fluidized bed or the heating zone. The diameter of the outer cylinder preferably ranges from about 18 cm to about 142 cm, most preferably about 41 cm, to provide a heating zone annulus having a width of about 1 cm to 10 cm, and preferably about 5 cm.

The peripheral heating zone annulus includes an upper inlet that allows the entry of a portion of the fluidized particles from the inner fluidized bed. To facilitate the understanding of the flow of the particles through the heating zone annulus and back into the reaction zone, consider the present invention wherein the particles in the inner bed and the annular heating zone are incipiently fluidized. The incipient fluidized state refers to the condition of a bed of particles that has fluidizing gases passing therethrough at a velocity just above the minimum fluidization velocity for the bed. Thus, at incipient fluidization, the entire bed and the entire heating zone annulus consists of a dense phase that will behave like a liquid. In this state, there will be no convective transport of particles because the bulk densities in both the inner bed and annular heating zone are the same, and consequently there is no driving force for circulation.

When the flow of fluidization gas through the inner reaction zone increases, bubbles will begin to form in the inner bed. This causes the inner bed to expand and therefore have a lower bulk density than the incipiently fluidized heating zone annulus. In the steady state, if both the inner bed and the bed of particles in the annular heating zone extend above the inner reaction zone wall, the top portions of the beds will be sharing the same free space and therefore the pressure in each bed at the top of the inner reaction zone wall will be the same. By free space is meant that portion of the reactor between the upper surface of a fluidized bed and the top of the reactor vessel. At the bottom of the bed, however, the pressure is higher in the annulus because of the higher bulk density of the material in the annulus. This results in a pressure gradient across the bottom of the annular heating zone to the bottom of the inner reaction zone. This pressure drop serves as the driving force for the introduction of the heated particles from the heating zone annulus to the inner reaction zone.

Although it is possible to maintain the particles in the heating zone annulus in a nonfluidized state, it is preferred that the particles be in a state of incipient fluidization because the heat transfer coefficient from the outer heating zone wall to the incipiently fluidized particles is greater than the heat transfer coefficient from the outer heating zone wall to nonfluidized particles. Since fluidized particles flow like liquids, the particles in an incipiently fluidized state are also more easily and uniformly reintroduced from the heating zone annulus into the reaction zone than are the particles in a nonfluidized state.

The bottom of the peripheral heating zone includes the outlet through which the heated particles, after passing downwardly through the heating zone, are introduced into the fluidized bed. As the particles flow downwardly through the heating zone, they pick up heat from a heating means disposed on the exterior of the outer heating zone wall. The heat is then transferred to the fluidized bed by the introduction of the heated particles to the reaction zone. It should be understood that heat is also supplied to the inner reaction zone through the inner reaction zone wall that surrounds the inner reaction zone because the annulus is hotter than the reaction zone.

The entrance to the inner bed at the bottom of the heating zone annulus behaves like an orifice in traditional fluid applications. The mass flow rate through the passage is proportional to the square root of the pressure drop across the orifice and is proportional to the area of the opening. The area of the opening should be kept as small as possible, consistent with good design parameters, in order to minimize the diffusion of silane into the heating zone annulus. The circulation of the particles between the annulus and the inner bed can be varied by changing the pressure drop across the entrance orifice or by using other means such as gas jets. The pressure drop is determined by the degree of fluidization in the annulus, the higher the degree of fluidization, the smaller the pressure drop and accordingly, the smaller the material circulation between the inner reaction zone and the heating zone annulus.

In situations where it is desirable to maintain the free surface of the bed of particles in the annular heating zone below the top of the inner reaction zone wall, the fluidized particles from the inner reaction zone will flow over the top of the wall and fall into the annulus. This condition could also occur after the batch removal of the product particles from a silane reactor. In either situation, under steady state conditions, the height of the bed in the annular heating zone will automatically adjust to a position where the mass flow of particles into the annulus is in equilibrium with the mass flow rate of particles out of the annulus. When establishing the equilibrium height, consideration should be given to ensuring the equilibrium height at least corresponds to the height of the heating means disposed on the exterior of the outer heating zone wall.

In the particular example of a silane pyrolysis reaction, it is desirable to isolate the outer heating zone wall from the silane-containing gas in order to prevent silicon from depositing thereon. This is achieved by fluidizing the particles in the heating zone annulus with hydrogen or inert carrier gases in the absence of any substantial amount of silane. Because the resistance to gas flow is greater through the heating zone annulus compared to the reaction zone, any mixing of gases, after they enter the reactor vessel, is generally a result of the fluidizing gases from the annular heating zone mixing into the silane containing gas used to fluidize the particles of the reaction zone. Although certain amounts of silicon may deposit on the inner reaction zone wall and thus reduce the efficiency of heat transfer from the heating zone annulus to the reaction zone through the inner reaction zone wall, an increase in the flow rate of heated silicon particles from the heating zone annulus should compensate for the loss.

The heating zone is preferably located on the inner periphery of the liners within the reaction vessel. Heat is supplied to the heating zone by a heating means that, in the pyrolysis of silane, maintains the temperature of the particles in the heating zone between the thermal decomposition temperature of the silane containing gas and the melting point temperature of silicon. Preferably, the temperature ranges between about 200° C. and about 1400° C. and most preferably, between 550° C. and about 1000° C. The heating means can be any type of resistive heating, conductive heating, inductive heating and/or other conventional means for supplying heat to the heating zone through the outer heating zone wall.

The fluidized bed reaction zone is surrounded by the heating zone and occupies the remaining inner portion of the reaction vessel. The reaction zone is heated by interaction with the heated particles that have been introduced to the inner reaction zone from the lower outlet of the peripheral heating zone and by heat supplied from the heating zone through the inner reaction zone wall. In the pyrolysis of silane, the temperature of the particles in the fluidized bed reaction zone ranges from about 200° C. to about 1400° C., preferably about 550° C. to about 1000° C. The temperature of the silicon particles in the peripheral heating zone annulus ranges from about 300° C. to about 1400° C., preferably about 550° C. to about 1000° C.

Therefore, the present invention provides a heated fluidized bed reactor wherein heat is supplied to the fluidized bed reaction zone by particles of the fluidized bed that have been heated in a peripheral heating zone. In the particular application relating to the pyrolysis of silane, the heating zone annulus serves to isolate the outer heating zone wall from silane containing gases that may decompose thereon and inhibit the heat transfer into the heating zone and, consequently, the inner reaction zone. The present invention will become more apparent from the following description of certain preferred embodiments when considered together with the accompanying drawings. Such drawings are set forth as being merely illustrative of the invention and not intended in any way to be limitative thereof.

Referring to FIG. 1, silicon particles 16 are fluidized in a reactor useful for the production of high purity polycrystalline silicon product particles 19 by the pyrolysis of silane containing gas. Silane containing gas in conduit 21 enters the bottom of the fluidized bed reactor vessel 12 below the portion 25 of the gas distributor plate that is positioned directly below the fluidized bed reaction zone 23. Hydrogen gas in line 20 also enters the bottom of the fluidized bed reactor vessel 12 below the portion 26 of the gas distributor plate that is directly below the peripheral heating zone annulus 27. The hydrogen gas and silane containing gas entering the bottom of the fluidized bed reactor vessel 12 are isolated from each other by wall 30, such that the gases cannot come into contact until after they pass through the gas distributor plate. The mixing of the hydrogen gas and the silane containing gas within the fluidized bed reactor 12 above the gas distributor is preferably restricted by positioning the lower end of the inner reaction zone wall 15 as close to the distributor plate as possible, taking into consideration the gap needed to allow the heated particles 24 to be reintroduced into the fluidized bed reaction zone 23. The hydrogen gas passes upwardly through the portion 26 of the gas distributor plate and fluidizes the particles 24 in the heating zone annulus 27 without a substantial amount of silane-containing gas mixing into the hydrogen gas. The silane containing gas enters the fluidized bed reaction zone 23 directly below the bed of particles 16 and preferably passes directly upward to fluidize the bed 23 without mixing into the hydrogen gas. Any mixing that does occur, preferably occurs by hydrogen gas mixing into the silane-containing gas as opposed to the silane containing gas mixing into the hydrogen containing gas. By isolating the outer heating zone wall 10 (e.g., quartz liner) from the silane containing gas, the amount of silicon that deposits on the heat transfer surface of the outer heating zone wall 10 is minimized.

Heat is supplied to the fluidized bed reaction zone 23 through the inner reaction zone wall 15 and by silicon particles 16 that have passed through the peripheral heating zone annulus 27. The peripheral heating zone annulus 27 occupies the space between the inner reaction zone wall 15 of the fluidized bed reaction zone 23 and the outer heating zone wall 10 of the reaction vessel 12. The peripheral heating zone annulus 27 contains laterally confined silicon particles 16 which have entered the heating zone annulus 27 through an upper inlet 13. The silicon particles 16 are in an incipient fluidized state 24 due to the lower fluidization gas velocity passing through the heating zone 27 compared to the gas velocity in the reaction zone 23. Heat is supplied to the incipiently fluidized silicon particles 24 by conductive heat transfer from a heat source 14 through the outer heating zone wall 10. The incipiently fluidized silicon particles 24 pass downwardly through the peripheral heating zone annulus 27 where the particles 24 pick up heat from the heating source 14. Near the bottom of the peripheral heating zone annulus 27 is an outlet 17 for the introduction of the silicon particles 24 into the fluidized bed reaction zone 23 from the heating zone annulus 27. The lower outlet 17 of the heating zone annulus may employ some type of driving force such as a pulsed gas jet 28 to promote the introduction of the silicon particles 24 to the fluidized bed reaction zone 23.

The silane feed gases entering the fluidized bed reaction zone 23 through the perforated plate 25 are thermally decomposed to silicon and deposit onto the silicon particles 16. The silicon particles 16 enlarge to form silicon product particles 19. The product particles 19 segregate in a collection zone near the bottom of the fluidized bed reaction zone 23 and are collected as indicated by the arrow 22. By-product hydrogen and other fluidizing gases that enter the bottom of the bed exit the fluidized bed reaction zone 23 through an upper outlet 11. The heating zone annulus 27 isolates the outer heating zone wall 10 from the silane-containing gas and consequently prevents the deposit of silicon thereon, a condition that reduces the heat transfer efficiency into the heating zone 27. Although silicon may deposit on the wall 15 of the inner reaction zone 23, thus reducing the heat transfer efficiency through the wall 15, such reduction has a minimal effect because the primary source of transferring heat to the reaction zone 23 is the heat introduced by the heated silicon particles 24 that reenter the inner reaction zone 23.

Figure 2:
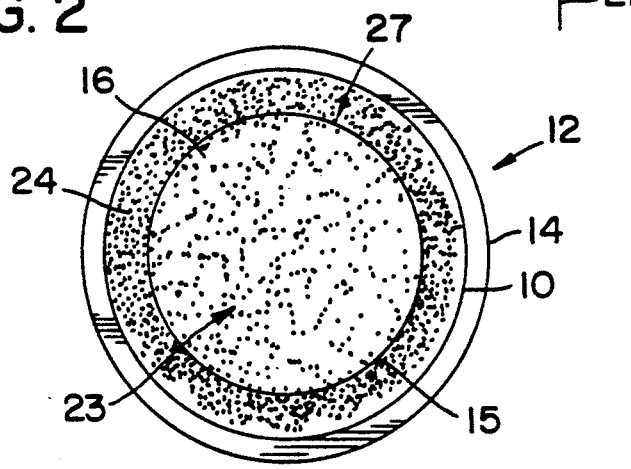
FIG. 2 illustrates a top view of the annular fluidized bed reactor in accordance with a preferred embodiment of the present invention.

Referring to FIG. 2, the peripheral heating zone annulus 27 is formed by the concentrically located wall 15 of the reaction zone 23 and the outer heating zone wall 10. Heat is supplied to the heating zone annulus 27 through the outer reaction zone wall 10 by the heating source 14. Within the annular region between the reaction zone wall 15 and the outer heating zone wall 10 are silicon particles 24 in an incipiently fluidized state. The silicon particles 24 comprise silicon particles 16 of the reaction zone 23 that have passed through the upper inlet 13 into the heating zone annulus 27 and will eventually be reintroduced into the reaction zone 23.

It is to be understood that modifications and changes to the preferred embodiment of the invention herein described and shown can be made without departing from the spirit and scope of the invention. The following examples are set forth to illustrate the invention, however, the examples are not intended as limitations thereof.

EXAMPLE 1

The following example is conducted in a fluidized bed reactor similar to the one illustrated in FIG. 1. The fluidized bed reaction zone is defined by a quartz reaction zone wall that has a diameter of 30 centimeters. The fluidized bed reaction zone is contained within a stainless steel jacket that has a diameter of 60 centimeters and is surrounded by insulation 10 cm thick. Kanthal heaters operating at 1200° C. are mounted on the interior wall of the stainless steel jacket and have an inner diameter of about 50 centimeters. Between the reaction zone wall and the Kanthal heaters is a 0.5 centimeter-thick quartz liner having an inner diameter of 39.5 cm. The quartz liner isolates the 4.75 cm thick annular heating zone created between the inner reaction zone wall and the quartz liner from the Kanthal heaters. The fluidized bed reaction zone contains silicon particles ranging in diameter from about 300 to 800 microns. The particles of the fluidized bed reaction zone are fluidized by a gas mixture of 20 volume percent silane and 80 volume percent hydrogen. The particles that occupy the annular heating zone are fluidized by 100 volume percent hydrogen. The silane and hydrogen gases enter the fluidized bed reaction zone and the annular heating zone through a conventional gas distributor that is positioned beneath the reaction zone and annular heating zone. The hydrogen gas and silane containing gas are introduced below the gas distributor into separate compartments that prevent the mixing of the hydrogen gas and silane containing gas. The hydrogen gas, at 773° K., enters a compartment below the portion of the gas distributor that is beneath the annular heating zone. The silane containing gas, at 300° K., enters a compartment directly below the portion of the gas distributor that is beneath the fluidized bed reaction zone. The superficial velocity of the silane containing gas at the gas distributor for the fluidized bed reaction zone is about 70 centimeters/second, corresponding to the minimum fluidization velocity for 800 micron particles in the reaction zone. The superficial velocity of the hydrogen gas at the gas distributor is about 42 cm/sec.

The silane gas distributor has a diameter at its large end of about 30 centimeters and a diameter at its small end of about 5 centimeters with a height of about 5 centimeters. Portions of the stainless steel jacket are held in place by three flanges having an outer diameter of 92 centimeters and a thickness of 9 centimeters. The reactor vessel has a height of 263.0 cm and extends 113.0 cm above the top of the fluidized bed which has a height of 150.0 cm. The pressure of the reactor is maintained at about two atmospheres.

The temperature at the top of the fluidized bed is 923° K. and the temperature at the bottom of the fluidized bed is 823° K. The temperature of the portion of the distributor cone through which the silane containing gas passes is maintained at 523° K. with the ambient temperature being about 300° K. The temperature of the portion of the distributor used to introduce the hydrogen gas into the annulus is about 773° K. The temperature of the heating zone annulus is about 933° K. The dense phase of the fluidized bed exhibits a void fraction of about 0.46 and the annular heating zone exhibits a void fraction of about 0.46. The heat transfer characteristics of the fluidized bed are summarized below:

| | |
|---|---|
| Heat Transfer coefficient between wall and bed | 0.00717 cal/cm$^2$ sec °C. |
| Thermal conductivity of liner | 0.0116 cal/cm sec °C. |
| Emissivity of liner | 0.60 |
| Thermal conductivity of insulation | 3.45 × 10$^{-5}$ cal/cm sec °C. |
| Heat capacity of silicon | 0.168 cal/gram °C. |

The mass flow rate of particles through the heating zone annulus and into the fluidized bed reaction zone is 11 kg/sec. The downward particle velocity through the annulus is 8.62 cm/sec. The total power input into the reactor from the Kanthal heaters is 110 kilowatts using a height of Kanthal heaters of about 115.0 cm surrounding the quartz liner that forms the outer heating zone wall.

Taking into consideration the heat losses and inputs attributable to the: (1) silane distributor; (2) product and effluent streams; (3) flanges; (4) radiation from the top and bottom of the bed; (5) insulation; and (6) heat transfer from Kanthal heaters through the bed walls; and assuming: (1) temperature of the fluidized bed reaction zone is constant everywhere except in the small region at the bottom of the bed; (2) temperature of the heating zone annulus is constant everywhere; (3) heat transfer through the quartz wall between the reaction zone and annular heating zone is neglected; (4) the temperature of the quartz liner is uniform in the axial direction; (5) the silane distributor temperature is constant and heat transfer between the bed and silane distributor is determined by the temperature of the bed and the temperature of the distributor; (6) the hydrogen distributor temperature is the same as the hydrogen feed gas; (7) heat transfer between the heaters and liners occurs by radiation only; (8) the silane feed stream enters the distributor at ambient temperature and the product silicon and effluent gases leave the reactor at the temperature of the bed; (9) the recirculating silicon particles enter the annular heating zone at the temperature of the bed and leave the annular heating zone at the temperature of the heating zone annulus; and (10) the bed and heater radiate as black bodies; the temperature of the fluidized bed is determined to be 650° C., clearly suitable for the economic decomposition of silane containing gases to silicon.

The present invention provides high heat flux to a fluidized bed, such as a fluidized bed for the pyrolysis of silane to silicon, in a region close to the cooled distributor where a large amount of heat loss is present. The present invention also has an equally important advantage in a silane pyrolysis reactor in that the deposition of silicon on the heating surface can be controlled or eliminated by keeping the silane containing feed gas away from the heated reactor walls. Further, any reduction in heat transfer efficiency resulting from the deposit of silicon on the inner reaction zone wall is minimized because the primary source of heat transfer into the inner reaction zone is the introduction of the heated particles of the annular heating zone into the inner reaction zone. The present invention has been described in relation to various embodiments, including the preferred applications and parameters. One of ordinary skill after reading the foregoing specification, will be able to effect various changes, substitutions of equivalents, and other alterations without departing from the broad concepts disclosed herein. It is therefore intended that the scope of Letters Patent granted hereon will be limited only by the definition contained in the appended claims and equivalents thereof.

What is claimed is:

1. A method of heating a silicon particle fluidized bed reaction zone comprising the steps:
   (a) supplying heat to a peripheral heating zone annulus surrounding an inner reaction zone within a reaction vessel, the peripheral heating zone annulus including an upper inlet for entry of silicon particles from the fluidized bed and a lower outlet for introducing heated silicon particles into the inner reaction zone, the particles contained in the heating zone annulus are in an incipient fluidized state and are laterally confined by an inner reaction zone wall and an outer heating zone wall, heat is supplied to the particles of the peripheral heating zone annulus through the outer heating zone wall by a heating means disposed externally to the outer heating zone wall;
   (b) introducing silane gas into the fluidized bed and a second gas that is substantially free of silane into the heating zone annulus to incipiently fluidize the particles in the heating zone annulus and minimize deposition of silicon in the heating zone annulus, the silane gas being introduced through a gas distribution plate below the inner reaction zone and the second gas being introduced through a gas distribution plate below the heating zone annulus; and
   (c) introducing the heated particles into the inner fluidized bed reaction zone.

2. The method of claim 1, wherein the lower outlet of the peripheral heating zone annulus includes a pulsed gas jet, the pulsed gas jet serving to promote the introduction of the heated particles of the heating zone annulus into the inner reaction zone.

3. The method of claim 1, wherein the inner reaction zone includes a fluidization gas velocity ranging from about 2 about 8 times the minimum fluidization velocity based on the average diameter of the particles in the fluidized bed.

4. A method for the production of high purity polycrystalline silicon by pyrolyzing a silane containing gas in a heated inner fluidized bed reaction zone contained within a reaction vessel wherein the improvement comprises:

(a) supplying heat to the inner reaction zone by introducing heated silicon particles downwardly from a peripheral heating zone annulus through an annular outlet into the inner reaction zone, the heated silicon particles being heated in the peripheral heating zone annulus, the peripheral heating zone annulus including the annular space between an inner reaction zone wall defining the inner reaction zone and an outer heating zone wall, heat is supplied to the silicon particles in the peripheral heating zone annulus by a heating means disposed externally to outer heating zone wall; and (b) introducing the silicon particles downwardly from the peripheral heating zone annulus through the annular outlet into the inner reacion zone with a pulsed gas jet.

5. A method for the production of high purity polycrystalline silicon by pyrolyzing a silane containing gas in a heated inner fluidized bed reaction zone contained within a reaction vessel wherein the improvement comprises:

(a) supplying heat to the inner reaction zone by introducing heated silicon particles downwardly from a peripheral heating zone annulus through an annulus outlet into the inner reaction zone, the heated silicon particles being heated in the peripheral heating zone annulus, the peripheral heating zone annulus including the annular space between an inner reaction zone wall defining the inner reaction zone and an outer heating zone wall, heat is supplied to the silicon particles in the peripheral heating zone annulus by a heating means disposed externally to outer heating zone wall; and (b) maintaining the particles at a greater bulk density in the annulus than the reaction zone to establish a pressure gradient drop across a bottom of the peripheral heating zone annulus to a bottom of the inner reaction zone, such that the pressure drop is the driving force for the introduction of the heated particles downwardly from the heating zone annulus outlet to the inner reaction zone.

6. The method of claim 5, wherein the peripheral heating zone annulus further includes an upper inlet for entry of silicon particles and a lower outlet, the lower outlet includes a pulsed gas jet for introducing the heated silicon particles into the inner reaction zone.

7. The method of claim 1 wherein the step of introducing silane gas and the second gas comprises introducing gas into separate silane gas and second gas compartments, wherein the silane gas compartment extends below the fluidized bed innr reaction zone but not below the heating zone annulus.

8. The method of claim 5 further comprising the step of maintaining the particles in the annulus in a state of incipient fluidization.

9. The method of claim 5 wherein the annulus forms a continuous annular outlet above the bottom of the inner reaction zone through which the particles are introduced downwardly into the bottom of the inner reaction zone.

10. The method of claim 9 further comprising the step of introducing silane gas into the inner reaction zone through a perforated plate at the bottom of the inner reaction zone, and introducing a second gas that is substantially free of silane into the annulus through a perforated plate at the bottom of the annulus to at least incipiently fluidize silicon particles in the peripheral heating zone annulus without promoting deposition of silicon in the annulus.

11. The method of claim 10 wherein the plates at the bottom of the inner reaction zone and annulus comprise a single plate through which gas passes, and a wall is provided below the single plate to form an inner gas chamber below the inner reaction zone that does not extend below the annulus, and the step of introducing a silane gas into the reaction zone comprises introducing silane gas under pressure into the inner gas chamber.

* * * * *